United States Patent [19]

Robinson et al.

[11] 4,334,883
[45] Jun. 15, 1982

[54] ISOTOPE SEPARATION BY LASER MEANS

[75] Inventors: C. Paul Robinson; Reed J. Jensen; Theodore P. Cotter; Norman R. Greiner; Keith Boyer, all of Los Alamos, N. Mex.

[73] Assignee: The United States of America as represented by the United States Department of Energy, Washington, D.C.

[21] Appl. No.: 387,859

[22] Filed: Aug. 14, 1973

Related U.S. Application Data

[63] Continuation-in-part of Ser. No. 270,800, Jul. 7, 1972, abandoned.

[51] Int. Cl.$^3$ .............................................. B01D 59/00
[52] U.S. Cl. ........................... 23/293 R; 204/157.1 R; 204/157.1 H; 423/3; 423/258
[58] Field of Search ............................. 55/158, 2, 17; 250/423 P, 419 G; 204/157.1 R

[56] References Cited

U.S. PATENT DOCUMENTS

| | | | |
|---|---|---|---|
| 3,443,087 | 5/1969 | Robieux et al. | 55/2 X |
| 3,558,877 | 1/1971 | Pressman | 55/2 X |
| 3,772,519 | 11/1973 | Levy | 250/41.9 G |
| 4,097,384 | 6/1978 | Coleman et al. | 204/157.1 R X |

OTHER PUBLICATIONS

Kataev, D. I. et al., "Spectroscopy of Vapors of Low-Volatility Compounds Supercooled in a Supersonic Stream", Sov. Phys.-JETP, vol. 37, No. 5, Nov. 1973, pp. 772-777, Translation from Zh. Eksp. Teor. Fiz. 64, 1527-1537.
Milne, T. A. et al., "Molecular Beams in High Temperature Chemistry" in *Adv. High Temp. Chem.*, vol. 2, 1969, pp. 107-150, Eyring, L. Ed.
Vallach, E., "Transverse Excitation Pulsed Laser in Gas Dynamically Cooled Mixtures", *App. Pys. Lett.*, 20(10):395-398, 1972.
Nuclear Eng. Int., vol. 19, #213, p. 68, Feb. 1974.
Metz, W. D., "Laser Enrichment: Time Clarifies the Difficulty", *Science*, vol. 191, pp. 1162, 1163, 1193, 1976.
Jetter, H. et al., "Uranium Isotope Separation Using IR Lasers", Proceedings Int. Conf. Uranium Isotope Separation, 1975.
Butler, J. F., "Pb-Salt Tunable Diode Lasers", Proc. 1st European Electro-Optics Markets & Tech. Conf., pp. 99-105, 1973.
Jensen, R. J. et al., "Prospects for Uranium Enrichment, *Laser Focus*, May, 1976, pp. 51, 52, 59-63.
Robinson, A. L., "Infrared Photochemistry (II): Multiphoton Isotope Separation", *Science*, 194: 45-48, Oct. 1, 1976.
Farrar, R. L. et al., "Photochemical Isotope Separation as Applied to Uranium", Report #K-L-3054, Rev. 1, Mar. 15, 1972.
Hagena et al., "Research on the Thermal Relaxation in Nozzle Flow . . .", Nuclear Science Abstracts, (vol. 16, 1962), Abs. No. 1931.
Hartmanshenn et al., "Reduction of Uranium Hexafluoride", Chemical Abstracts (vol. 75, 1971), Abs. No. 94217z.
Kidder, "Isotope Separation by Means of Selective Photoexcitation", Lawrence Livermore Labs., QD-7-2-98, (Nov. 1972).
Hagena et al., "Untersuchung der Thermischen Relaxation bei Düsenstromugen . . .", Z. Naturforsch., 15a851-8, (1960).

*Primary Examiner*—Deborah L. Kyle
*Attorney, Agent, or Firm*—Edward C. Walterscheid; Richard G. Besha; James E. Denny

[57] ABSTRACT

A process for separating isotopes by selective excitation of isotopic species of a volatile compound by tuned laser light. A highly cooled gas of the volatile compound is produced in which the isotopic shift is sharpened and defined. Before substantial condensation occurs, the cooled gas is irradiated with laser light precisely tuned to a desired wavelength to selectively excite a particular isotopic species in the cooled gas. The laser light may impart sufficient energy to the excited species to cause it to undergo photochemical reaction or even to photoionize. Alternatively, a two-photon irradiation may be applied to the cooled gas to induce photochemical reaction or photoionization. The process is particularly applicable to the separation of isotopes of uranium and plutonium.

1 Claim, 8 Drawing Figures

ISOTOPE SEPARATION BY LASER MEANS

The invention described herein was made in the course of, or under, a contract with the U.S. ATOMIC ENERGY COMMISSION.

REFERENCE TO RELATED APPLICATION

This application is a continuation-in-part of application Ser. No. 270,800 now abandoned, also entitled "Isotope Separation by Laser Means," and filed July 7, 1972.

BACKGROUND OF THE INVENTION

The invention relates to a method of isotope separation based on selective excitation of isotope species and more particularly to a method wherein the selective excitation is initiated by laser means.

For various nuclear applications it is exceedingly important that the fissile isotopes $^{235}$U and $^{239}$Pu be separated from or strongly enriched in admixtures with other isotopes of uranium and plutonium, respectively. Presently, the only economically viable method for producing uranium enriched in $^{235}$U is the gaseous diffusion process which requires very large capital investment and tremendous plant facilities. There is presently no practical scheme available for separating $^{239}$Pu from $^{240}$Pu, a separation which is highly desirable for certain military applications.

With the advent of lasers tunable to very narrow frequencies over a wide range of the spectrum, it has become apparent that by controlling the spectral response of the interaction of light with matter, it is possible, in principle, to produce selective reactions that can change the composition and properties of the matter. The conditions required to achieve such selectivity are: (1) high monochromaticity of the exciting light; (2) the selectivity of the primary process of light interaction with the matter (the existence of narrow nonoverlapping absorption lines); and (3) conservation of the induced selectivity in successive physical and chemical processes. See, e.g., R. V. Ambartzumian and V. S. Letokhov, "Selective Two-Step (STS) Photoionization of Atoms and Photodissociation of Molecules by Laser Radiation,38 11 Applied Optics 354 (1972).

Laser art has advanced sufficiently that tunable lasers having bandwidths narrower than 0.0002 cm$^{-1}$ are available so that the first condition is completely satisfied. Efficient amplification of narrowly tuned infrared oscillators can be accomplished with high pressure electron beam controlled electric discharge gas lasers. Such a scheme allows narrow bandwidth with high overall electrical efficiency. High overall efficiency can be obtained by use of parametric oscillator and phase matching techniques for tuning efficient visible and ultraviolet lasers such as lead atom, copper atom, and Xe$_2$ lasers. Tunable dye lasers have sufficiently narrow bandwidths in the range 3600 to 7200 Å, although their electrical efficiency is lower.

The second and third conditions present substantial problems. For example, in principle the second condition can be met by the interaction of precisely tuned laser light provided that there exist certain discrete electronic and vibrational transitions of matter in the gaseous phase. Even if discrete transitions exist, it is frequently difficult to ascertain in a gaseous species which transitions are appropriate for selective interaction with tuned laser light.

Once selective excitation has been made to occur, there are numerous processes by which the selectivity may be lost. A primary loss mechanism is collisional energy transfer between molecules. Thus if the third condition is to be achieved, it is highly desirable that the selectively excited species be transformed to a stable or metastable state. One means by which the selectivity can be stabilized is through photoionization or photodissociation of an excited species. A problem, however, is that photoionization or photodissociation may not themselves be selective.

It is known in the art that the stabilizing effect of either photoionization or photodissociation may be used advantageously if they are separated from the selective excitation step through use of photons or light quanta of differing energies $h\nu_1$ and $h\nu_2$. Photons of energy $h\nu_1$ excite a certain state of the discrete energy spectrum in a particular species, and photons of energy $h\nu_2$ photoionize or photodissociate the excited species. The energies of the photons satisfy the following conditions:

$$h\nu_1 + h\nu_2 > E_i, E_d$$

$$h\nu_2 < E_i, E_d$$

where $E_i$ is the photoionization energy of an atom or molecules from the ground state and $E_d$ is the photodissociation energy of a molecule from the ground state.

The art indicates that this two-step process, or two-photon process as it is also known, is applicable to the separation of isotopes. A prerequisite for such separation is the existence of a suitable isotope shift in the absorption spectra of the element or one of its compounds so that only one isotopic species is excited by the tuned light.

In U.S. Pat. No. 3,443,087, issued May 6, 1969, Robieux et al. reveal a process for ionizing selectively a gaseous compound of an isotope which is a part of a mixture of isotopes which comprises irradiating the mixture of isotopes with light of two different wavelengths in two steps, the first irradiation by light of one wavelength serving to selectively excite the molecules of one isotope and the second by light of another wavelength serving to ionize the excited molecules. The ionized molecules are then subjected to electric or magnetic fields or a combination thereof to deflect them away from the un-ionized isotopic compound.

Using a first irradiation of infrared light and a second irradiation with ultraviolet light, Robieux et al. indicate that $^{235}$UF$_6$ and $^{238}$UF$_6$ may be separated according to the process of their invention. The rationale behind their two-photon process is that finely tuned energy available from absorption in the infrared region of the spectrum will selectively excite one of the uranium isotopes, preferably the $^{235}$U, but is inadequate to excite the isotopic compound which is absorbing it sufficiently to produce ionization. Line breadths in the ultraviolet spectral region, where there is sufficient energy to produce ionization, are larger than at lower frequencies so that it is much more difficult to achieve the requisite selective absorption in this region of the spectrum. That is, although photoionization can readily be produced by ultraviolet light, it is not likely to be selective. Through use of the two-step absorption process, one isotopic species is selectively excited by the infrared and then a sufficient amount of energy is provided by the ultraviolet (which is absorbed by both species) to just drive the excited isotopic compound past the ionization threshold, whereas the isotopic compound that remained in the ground state during the infrared irradiation is not sufficiently excited by the ultraviolet to be ionized even though it absorbs to substantially the same degree.

Reasonably sharp isotope shifts have been identified for uranium and its compounds, but at either very high or very low temperatures. The very high temperatures have been necessary for elemental uranium. Unfortunately, even at 1600° C. uranium has a vapor pressure of only 1 micron, which is much too low to obtain any reasonable light interaction with the vapor. Thus a substantially higher temperature is required, and an isotope separation process based on the use of elemental uranium as the feed material does not therefore appear practical. Cesium uranyl chloride ($CsUO_2Cl_4$) and cesium uranyl nitrate ($CsUO_2(NO_3)_3$) enriched in $^{235}U$ have shown an isotopic shift of 1.62 cm$^{-1}$ at 20° K. While the spectral lines are sharp at 20° K., they become broad at 77° K. and cannot be resolved at higher temperatures. At the low temperatures at which the lines are defined, however, these compounds exhibit essentially no vapor pressure.

Certain isotopic shifts in the infrared spectrum of $UF_6$ at room temperature have been determined by measurements on separated samples of $^{238}UF_6$ and $^{235}UF_6$. The 623 cm$^{-1}$ $\nu_3(F_{1u})$ band shows a measured shift of 0.55 cm$^{-1}$. Measurements on the other infrared bands indicate a shift of 0.1 to 0.2 cm$^{-1}$ for the $\nu_4(F_{1u})$ vibration, the only other of the six vibrations which should show a nonzero isotope shift. These measured shifts are gross in nature, however, and no fine line spectra were resolved.

Although Robieux et al. in U.S. Pat. No. 3,443,087 state that a chemicl reaction may be used to separate the isotopes, they give no example of what chemical reactions will suffice or how such chemical reactions might be brought about. They consequently make no claims with respect to chemical separation. In a recent report, R. C. Farrar, Jr. and D. F. Smith review the literature dealing with photochemical means for isotope separation, with particular emphasis on the separation of uranium isotopes. See "Photochemical Isotope Separation as Applied to Uranium," Union Carbide Oak Ridge Gaseous Diffusion Plant Report K-L-3054, Rev. 1 (Mar. 15, 1972). Although photochemical dissociation of $UF_6$ would have advantages over photochemical reactions involving two molecular species, Farrer et al. do not devote any discussion to it.

SUMMARY OF THE INVENTION

Selective excitation of isotopic series of a gaseous compound by laser light forms the basis of an efficient isotope separation method. The method is straightforward for separating isotopes of elements which form compounds that are volatile at low temperature, that is, a temperature such that RT is less than E*, the energy of the lowest vibrational state of the molecule. However, to separate isotopes of elements that do not form compounds volatile at low temperatures, it is necessary to prepare the compound in a supersaturated gaseous state in order to obtain the following advantages of a low temperature environment: (1) slow energy transfer and therefore no or greatly reduced scrambling, (2) simple infrared spectrum because of depopulation of vibrational states and rotational states, (3) low adverse chemical reactivity, and (4) good spectroscopic separation factors because of sharpened infrared, visible, or ultraviolet spectrum.

We have found that supersaturated gas of the desired low temperature can be readily prepared by adiabatic expansion of a volatile compound through a converging-diverging nozzle of the type well known in the gas dynamic laser art. The gas is then irradiated with a precisely tuned laser to provide selective excitation of an isotopic species before substantial condensation of the gas occurs. The excitation may be sufficient to produce photochemical reaction or photoionization of the excited species. The photochemical reaction may take the form of photodissociation of the excited molecules or reaction of the excited molecules with a second molecular species. Alternatively, the two-photon process may be applied to the supersaturated gas to provide the requisite selective photoionization or photochemical reaction. In the case of photoionization, electrical or magnetic means or a combination thereof are provided to separate the ionized from the un-ionized species. In an embodiment employing photochemical reaction, physical or chemical means are provided for separating the isotopic product of the reaction from the unreacted isotopic species.

The method of this invention is applicable to any isotope separation scheme using selective laser excitation of isotopic species wherein a more sharply defined isotopic shift results from precooling. It has particular utility in the separation of isotopes of uranium and plutonium using compounds such as $UF_6$, $UCl_4$, $UBr_4$, and $PuF_6$.

DESCRIPTION OF THE PREFERRED EMBODIMENTS

Figure 1:
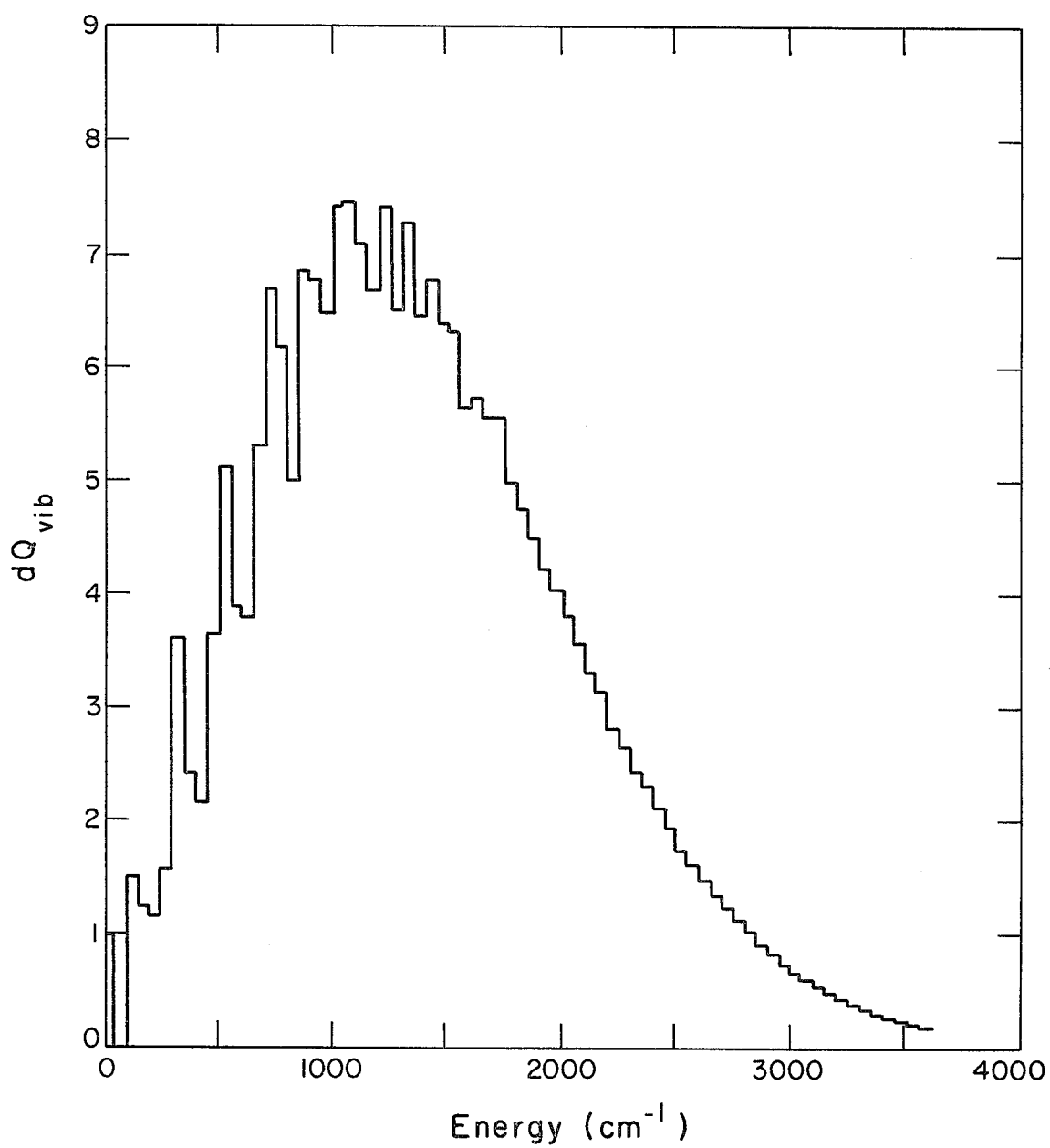
FIG. 1 shows the vibrational energy distribution in $UF_6$ at 300° K.

In molecules containing different isotopes the classical vibration frequencies differ according to $$|\Delta \nu| = \tfrac{1}{2}(\Delta\mu/\mu)\nu$$

where $\nu$ is the vibration frequency, and $\mu$ is the reduced mass of the molecule. The reduced isotopic mass difference $\Delta\mu$ is nonzero only if the isotopic atoms are in motion during the vibration. The resultant difference in frequency, $\Delta\nu$, is called the isotope shift. Laser isotopic separation is possible because the frequency purity of laser light is sufficient to be resonantly absorbed by one isotopic species without affecting other nonresonant isotopes. In any isotope separation process based on the selective excitation of isotopic species by tuned laser light, it is essential that the isotopic shift be as sharply delineated as possible.

As used in this application, the term "laser light" includes coherent radiation in the ultraviolet, visible, and infrared portions of the spectrum. By selective excitation is meant the tuning of the laser light frequency to effect absorption by an optical absorption state of one isotope only.

To obtain very sharp spectral features, it is highly preferable that the isotopic mixture which is to undergo separation be in the gaseous state when it is irradiated with the tuned laser light. Gaseous mixtures permit efficient interaction of the laser light with the desired isotopic species while at the same time limiting the possibility that selectively excited molecules will undergo scrambling, that is, transfer of their excitation to nonexcited species. It will be readily apparent that scrambling reduces the efficiency of isotope separation and if sufficiently severe may prevent any separation at all.

The separation of isotopes of heavy elements is, in general, more difficult than separation of isotopes of light elements. The isotope shifts of optical absorption lines are much smaller for compounds of heavy elements, and since most of the gaseous compounds of heavy elements are polyatomic, there exist a very large number of vibration-rotation states closely spaced in frequency. Selective light absorption is further complicated for heavy elements because at temperatures at which their compounds are gaseous, a large number of vibration-rotation states are already excited.

For example, the room temperature infrared spectrum of $UF_6$ vapor corresponds to a combination rotational-vibrational transition. It includes many lines that have never been resolved. A primary reason for the gross nature of the isotope shifts in $UF_6$ at room temperature is the existence of so-called "hot" bands in the spectrum. Because the three bending vibrations occur at low frequencies, the excited bending vibration states are sufficiently populated at room temperature that almost none of the molecules are in the ground state. Also, due to anharmonic effects, the "hot" bands do not precisely coincide with the ground state bands. As a result, there are many more lines in the spectrum than would otherwise be present if the "hot" bands either did not exist or were not appreciably populated.

FIG. 1 shows the extent of $UF_6$ "hot" bands populated at 300° K. The plot is the contribution $dQ_i$ for a particular vibrational level i to the total vibration partition function for equilibrium at 300° K., where $$dQ_i = D(i) \exp\left(-\frac{h}{kT}\right) \sum_{i=0}^{\infty} \sum_{i=1}^{6} v_i v(i) .$$

where $D(i)$ is the degeneracy of the $i^{th}$ state, $v_i$ are the frequencies of the six fundamental vibrational modes, and $v(i)$ are the occupation quantum numbers. It should be noted that only 0.4% of the molecules are in the ground vibrational state and that more than half of the molecules are excited to energies greater than 1200 $cm^{-1}$. There are 13,000 levels which are excited. Degeneracies as high as 22,000 are achieved. It is readily apparent that tuning a laser to operate between two individual states at room temperature is an exceedingly difficult task and there is no indication that it can in fact be done.

Spectral separation and resolution of isotopically shifted absorption lines or narrow bands may, however, be much improved by having the absorbing material at the lowest feasible temperature. In fact, sufficient cooling results in clear-cut spectrum simplification. By spectrum simplification is meant essentially the removal of overlapping absorption features in order to isolate selectable isotopic absorption states. But cooling alone is not enough to achieve an effective isotope separation process based on selective excitation of isotopic species. At the same time, while the material density must not be so high as to degrade the resolution by pressure broadening, it must be high enough to yield acceptable absorption in reasonable optical path length. When the equilibrium vapor pressure of the optically absorbing compound is unacceptably small at the desired low temperature, an optimum state of the absorber, i.e., some reasonable density at the desired temperature, can be achieved by adiabatically expanding the gas. This can be done by a supersonic expansion which results in a state of very high supersaturation at low temperature in the high velocity gas stream.

When a fluid is expanded to supersonic velocities, a large reduction in pressure is required. Since the flow derives its energy from the internal energy and random motion of the fluid, a large reduction in the bulk fluid temperature also ensues. Apparatus for producing such a fluid expansion ranges from ordinary nozzles to molecular beam nozzles. A preferred means of producing the requisite adiabatic expansion is a convergent-divergent slit nozzle of the type well known in the gasdynamic laser art. A nozzle of this type is preferred over a molecular beam apparatus because the number density of molecules to be isotopically separated in the cooled region is much greater. A molecular beam apparatus consists of a nozzle with expansion walls normal to the flow direction and must be operated at very high pressure ratios. In some circumstances, it may be useful to utilize the collisionless regime of a molecular beam rather than the collision dominated conditions of walled nozzle expansion systems. For example, there may be situations in which the time between molecular collisions in the expanded fluid must be long to avoid scrambling before separative processes occur between the laser-excited and unexcited molecules.

The threshold condition for the onset of condensation in the flow will occur for some critical pressure at the inlet to the nozzle, below which successful operation can be achieved over a range of pressures. Condensation of the cooled gas in the light interaction and absorption zone is undesirable in that substantial light scatter may occur and scrambling is produced, i.e., energy exchange occurs between excited and unexcited isotopic species. The residence time of the flowing gas can be made of short duration by reducing the nozzle length insofar as this is compatible with uniform expansion efficiency. Even though condensation in the light interaction and absorption zone is undesirable, it will be apparent that some degree of condensation may be tolerated despite the reduction in efficiency of the separation process which it may produce. The amount of condensation which will still permit effective isotope separation depends in large measure on the particular molecular and isotopic species involved.

The cooling that can be achieved by the adiabatic expansion of a single gas is readily determined by the well-known gas-dynamic relationship $$T/T_o = (P/P_o)^{(\gamma-1)/\gamma}$$

where the subscript zero denotes pre-expansion conditions and $\gamma$ is the ratio of specific heats. Temperatures can be achieved by this technique which are considerably below the condensation point, and the gas will remain supersaturated at high Mach numbers. The lower limit attainable by this method depends upon the nuclear condensation of the particular gas. If the gas containing the isotopic species to be separated has a low $\gamma$ (e.g., $UF_6$ has a $\gamma$ of 1.065), it can be cooled substantially more by the addition of a so-called carrier gas. The carrier gas should have a high $\gamma$ in order to maximize the effective $\gamma$ of the mixture and thereby minimize $T/T_o$ for a given $P/P_o$ ratio. The monatomic gases (noble gases) have $\gamma = 1.67$ and helium in particular also has a condensation point of only 4°K., making it the optimal carrier gas. Thus for maximum cooling the nozzle should be fed with helium as the carrier gas and the absorbing compound admixed in lesser concentration.

Figure 2:
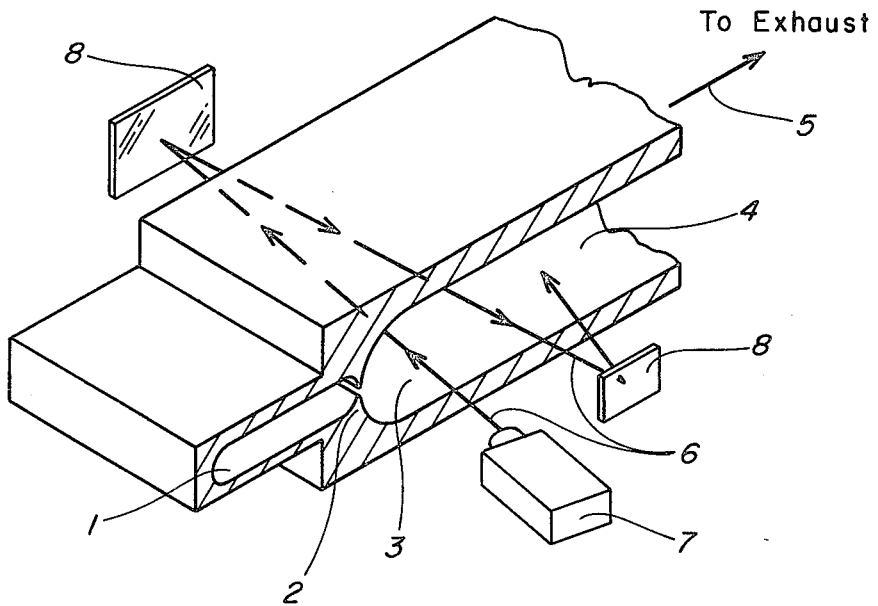
FIG. 2 shows a nozzle suitable for adiabatically expanding a gaseous compound in the process of this invention.

The adiabatic expansion is readily accomplished by means of contoured supersonic nozzles of the type well known in the gas dynamic laser art. Such a nozzle, having a slit configuration, is shown in FIG. 2. A gaseous compound containing a mixture of isotopes is introduced into plenum chamber 1 and allowed to flow supersonically through throat 2. Diverging region 3 of the nozzle is so designed to allow optimum expansion of the gas to some uniform pressure which obtains in constant area duct 4. In duct 4 the gas is in a supersaturated state and highly cooled. Preferably, little or no condensation occurs in duct 4 before the gas enters exhaust 5. The cooled gas in duct 4 is easily irradiated transversely by means of laser beam 6 from laser 7. The optical path length of irradiating beam 6 may be governed by the length of throat 2 and the number of mirrors 8 by which light beam 6 is reflected back and forth in duct 4. Factors which determine a reasonable optical path length are the photon absorption cross section and (adjustable) gas number density.

Laser 7 is finely tuned so that beam 6 selectively excites molecules containing only a particular isotopic species. In various embodiments of the process of this invention, beam 6 may be sufficiently energetic to (1) induce photochemical reaction of the excited molcules with a second gaseous compound mixed with the compound containing a mixture of isotopes, (2) photodissociate the excited molecules, or (3) photoionize the excited molecules. In cases (1) and (2), physical and/or chemical means may readily be used to separate the reaction product containing the particular isotopic species from the unreacted gas. In case (3), deflecting means such as an electric field, a magnetic field, or a combination thereof may be used in duct 4 to deflect ionized molecules containing the particular isotopic species away from the un-ionized molecules exhausting from duct 4. In still other embodiments, the two-photon process may be used to produce essentially the same photochemical reaction or photoionization. In the two-photon process, an additional light source is used to irradiate the cooled gas in duct 4 at a different frequency than that of laser 7. It will be apparent that this second irradiation can easily be accomplished with a nozzle of the type shown in FIG. 2.

The advantageous aspects of adiabatic cooling as applied to isotope separation based on selective excitation of isotopic species may be demonstrated with regard to mixtures of $^{235}UF_6$ and $^{238}UF_6$. Uranium hexafluoride is the only uranium compound having any substantial vapor pressure at or near room temperature. Typically, this compound exhibits a vapor pressure of about 100 Torr at room temperature, but at 75° K. or less, where thermal bands are depopulated, it has a vapor pressure that is immeasurably small (est. $10^{-26}$ mm Hg).

Figure 3:
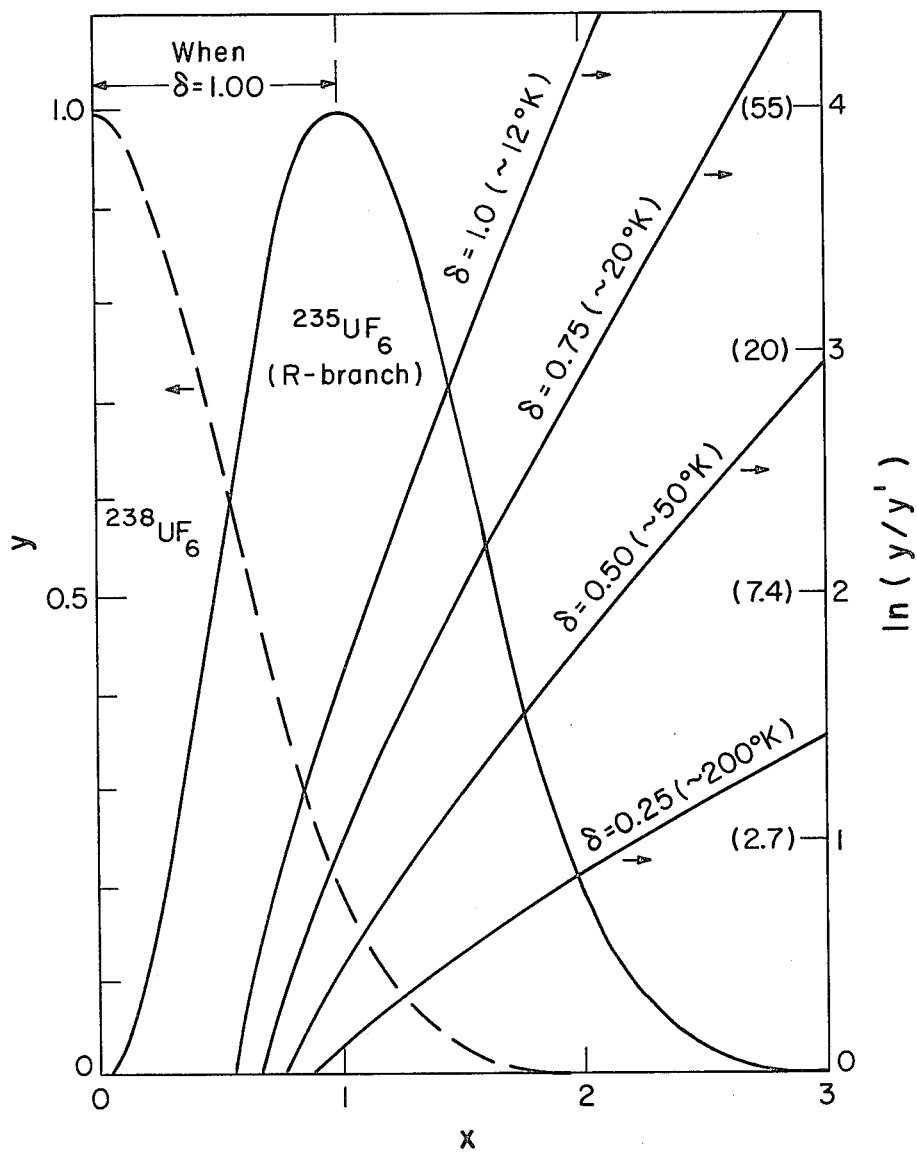
FIG. 3 shows (a) the theoretical shape for a P (or R) branch absorption band of a spherical top molecule such as $UF_6$, and (b) certain curves of the spectroscopic separation factor for $^{235}UF_6$ and $^{238}UF_6$ at several temperatures of interest.

The enhanced degree of resolution of the absorption bands in a mixture of the two isotopic molecules obtained by cooling the gas is demonstrated in FIG. 3. As the rotational temperature is decreased, the absorption envelopes get sharper and more intense, such that the peak of the R-branch of $^{235}UF_6$ is displaced from the peak for $^{238}UF_6$ and is in fact coincident with the tail of the $^{238}UF_6$ absorption envelope. Under this condition the $^{235}UF_6$ will be preferentially excited by light whose wavelength coincides with the position of the $^{235}UF_6$ peak, since the $^{238}UF_6$ will absorb to a much lesser extent.

In FIG. 3, the dimensionless parameter y gives the relative intensity as a function of x for the R-branch, and x represents a given wave number for excitation. Parameter y is given by $$y = \alpha_x / \alpha_1$$

where $\alpha_x$ is the absorption coefficient at wave number x and $\alpha_1$ is given by the relationship $$\alpha_1 = (-1/IP)\log(I/I_o) \approx 5 \times 10^{-2}(300/T)^{3/2} \text{Torr}^{-1}\text{cm}^{-1}.$$

The parameter $y/y'$ is the selectivity for a given position in the rotational envelope (i.e., at a given x) and $\delta$ is the ratio of the isotope shift to the envelope width and is a function of the rotational temperature according to the expression $$\delta \approx \frac{1}{5}\sqrt{\frac{300}{T}}.$$

For example, if a mixture of $^{235}UF_6$ and $^{238}UF_6$ is irradiated with a laser tuned to the portion of the $^{235}UF_6$ R-branch corresponding to $x = 2$ and the temperature is 50° K., the proportion of $^{235}UF_6$ molecules in the excited population is ~5 times as great as the proportion in the unexcited population. If the temperature is 20° K., this number is increased to ~20. Starting with natural $UF_6$ at 50° K., about 3.5% of the excited molecules will contain $^{235}U$. FIG. 3 shows in quantitative terms the advantage of low temperatures and the trade-off between good separation factors and poor absorption as x is increased.

The strongest absorption band for $UF_6$ is at 626 $cm^{-1}$ (16.0μ). The literature indicates that this band has a 0.55 $cm^{-1}$ isotope shift at room temperature, i.e., 300° K., as measured at the peak of the broad absorption contour. There is nothing in the prior art that reveals any measurement of the isotope shift in gaseous $UF_6$ at lower temperatures. The present inventors have found that at 228° K. the absorption contour is substantially sharpened and the isotope shift is measured as 0.68

$cm^{-1}$. There are three other bands that have about the same isotope shift but are ~100 times weaker. They are at 1294 $cm^{-1}$ (7.73$\mu$), 1151 $cm^{-1}$ (8.69$\mu$) and 825 $cm^{-1}$ (12.12$\mu$). Any other bands with suitable isotope shifts will be at least 20 times weaker yet. At other than the 16$\mu$ band, the optical path length must be about a meter or more. The peak absorption coefficient in the above units is proportional to $T^{-3/2}$, so lower temperatures give somewhat larger peak intensities.

Figure 4:
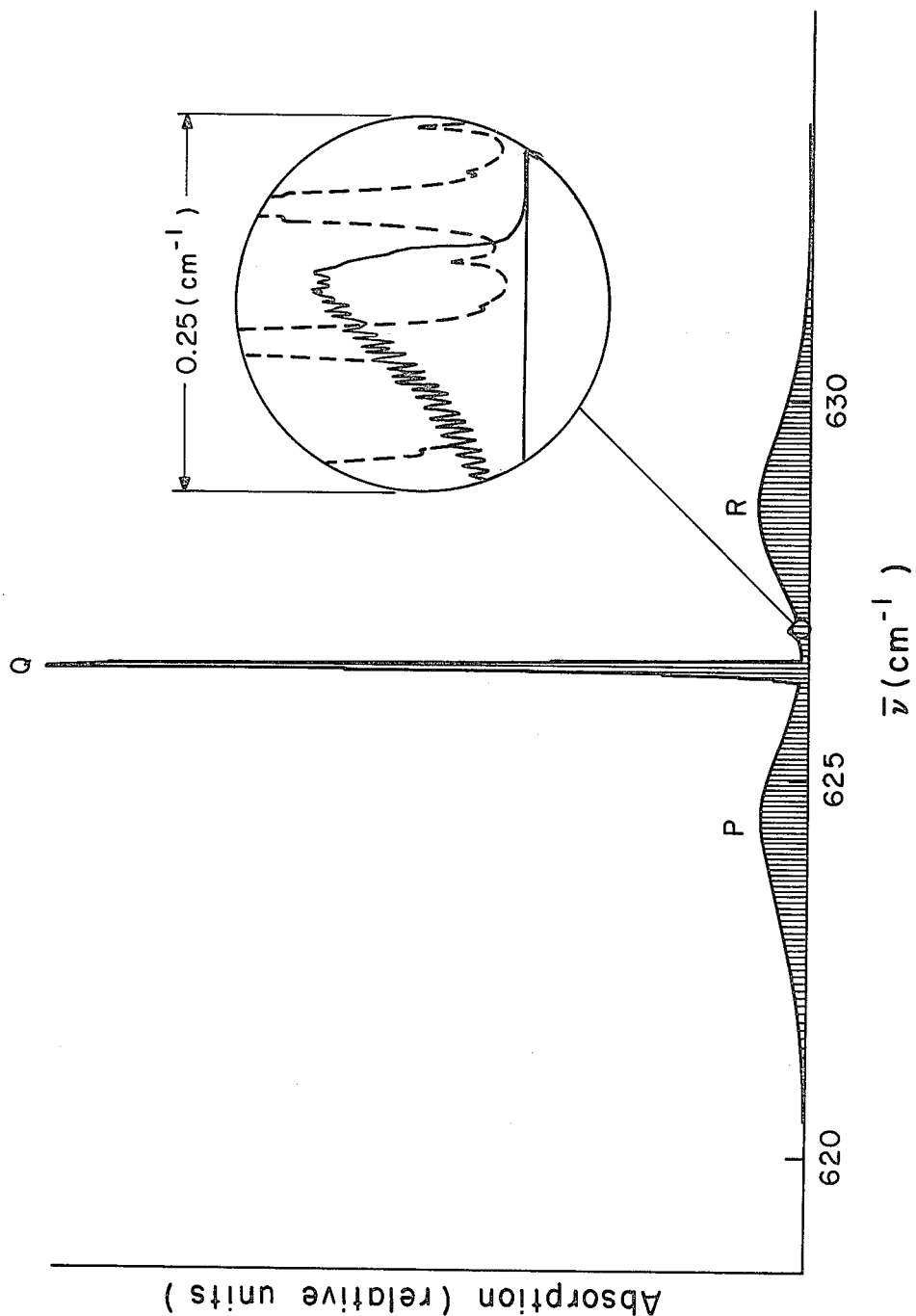
FIG. 4 is a calculated infrared absorption spectrum for the $\nu_3$ state in natural $UF_6$, i.e., $UF_6$ containing 0.7% $^{235}U$, at 50° K. with a $^{238}UF_6$–$^{235}UF_6$ isotope shift of 0.68 cm$^{-1}$.
Figure 5:
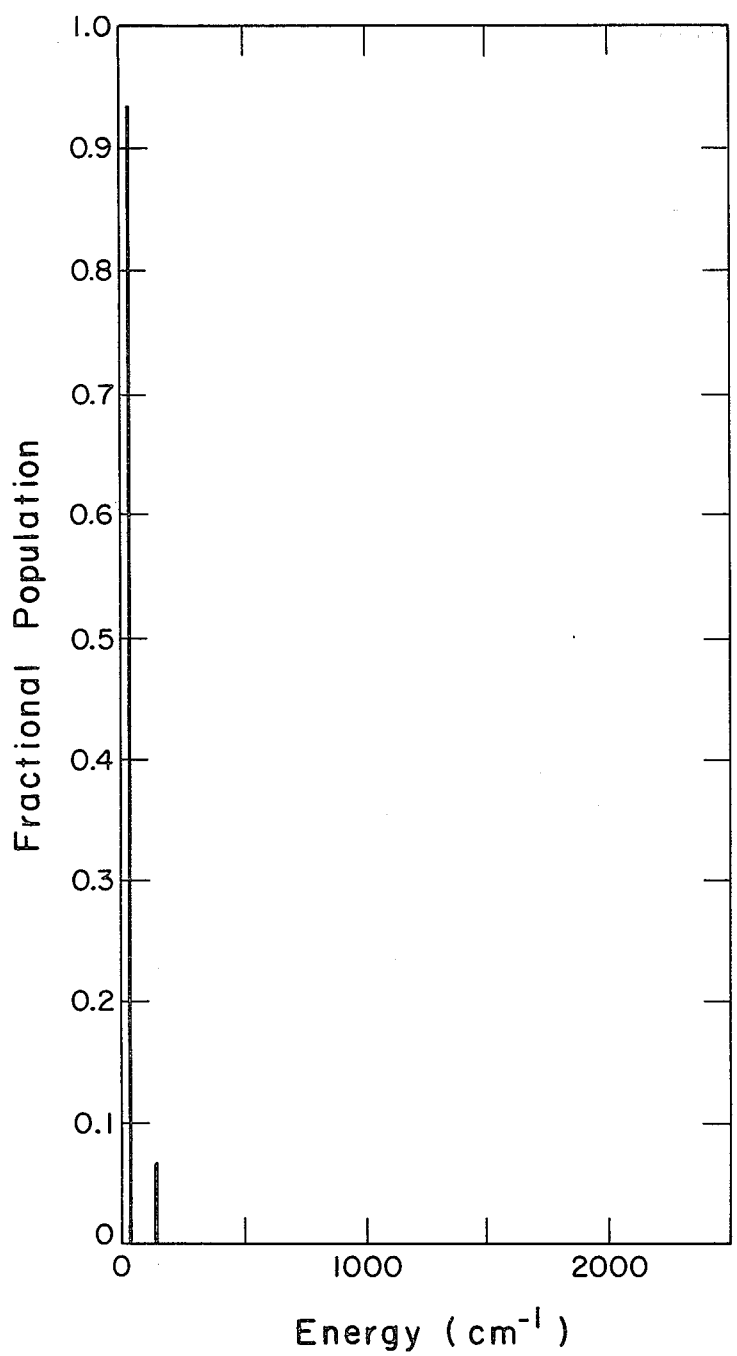
FIG. 5 shows the vibrational energy distribution in $UF_6$ at 50° K.

FIGS. 4 and 5 further demonstrate certain of the advantageous effects of cooling in enhancing the degree of resolution of the absorption bands in a mixture of two isotopic species. FIG. 4 presents the calculated infrared absorption versus wave-number for the $\nu_3$ fundamental vibrational state in the $UF_6$ gas phase at 50° K. with a $^{238}UF_6$–$^{235}UF_6$ isotope shift of 0.68 $cm^{-1}$. The P, Q, and R transitions are indicated. The computer code which produces this calculation contains the spectroscopic terms obtained from $UF_6$ spectra and gives excellent fits to infrared absorption data for $\nu_3$ at 373° K., 300° K., and 238° K. From FIG. 4, it is obvious that selective absoprtion of either $^{238}UF_6$ or $^{235}UF_6$ at 50° K. can be accomplished by tuning a laser to the proper frequency. In this regard, it should be noted that gas lasers are available which have a nominal width of ~0.005 $cm^{-1}$. In order to work with $UF_6$ in as many initial rotational states as possible, it is advantageous to operate at the Q-branch absorption. In the enlarged porton of FIG. 4, the solid line represents the Q-branch while the dotted line is the R-branch. FIG. 5 shows the dramatic effect on the "hot" bands of $UF_6$ when it is cooled to 50° K. More than 93% of the molecules are in the ground vibrational state. The remainder are in the first excited state, the $\nu_6$ fundamental.

With a nozzle such as that shown in FIG. 2 providing an expansion ratio of 20:1, and natural $UF_6$ at room temperature (300° K.) in the plenum with a $UF_6$ pressure of 100 Torr and a helium pressure of 900 Torr, expansion through the throat and diverging region can in principle provide a supersaturated gas in the constant area duct at a pressure (combined He and $UF_6$) of 2 Torr and a temperature of about 30° K. The density of the gas in the constant area duct is about $5 \times 10^{16}$ molecules/$cm^3$, which allows a quite reasonable optical path length.

The cooling effect of a nozzle such as that shown in FIG. 2 has been demonstrated. A gas mixture consisting of 5% natural $UF_6$ and 95% He at a temperature of 300° K. and a pressure of about 1450 Torr was expanded through a slit nozzle having an area ratio of 22 to product a supersaturated gas in the constant area duct at a pressure (combined He and $UF_6$) of 4 Torr and a temperature of about 48° K. There was no evidence of condensation in the constant area duct.

It is in principle possible to use laser excitation to produce separation of uranium isotopes from supersaturated gaseous $UF_6$ at 50° K by means of photodissociation, photoionization, photoreaction, and photodeflection techniques. Photodeflection is no part of the present invention; however, the other techniques are within the ambit of the invention. A preferred technique for separating uranium isotopes using supersaturated gaseous $UF_6$ is a two-photon photodissociation process. In one embodiment of this process, a mixture of He and $UF_6$ is expanded through a supersonic contoured slit nozzle of a type well known in the gas dynamic art to high Mach numbers with a very low local temperature, i.e., on the order of 50° K., while yet maintaining a $UF_6$ gas pressure at which reasonable optical path lengths are possible. The supersaturated gaseous $UF_6$ thus produced is then irradiated with a first laser light in the infrared portion of the spectrum and a second laser light in the ultraviolet portion of the spectrum. This two-photon irradiation may be used to produce selective disassociation of a $UF_6$ molecule according to the following two steps.

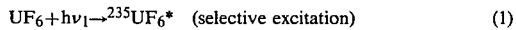
$UF_6 + h\nu_1 \rightarrow {}^{235}UF_6^*$ (selective excitation)     (1)

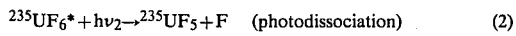
${}^{235}UF_6^* + h\nu_2 \rightarrow {}^{235}UF_5 + F$ (photodissociation)     (2)

It will be readily apparent that by proper tuning of the infrared laser ($h\nu_1$), molecules containing $^{238}U$ can be selectively excited rather than those containing $^{235}U$. Uranium pentafluoride is a stable solid that can readily be removed from the light interaction and absorption region of the flowing $UF_6$ by physical means, e.g., by filtering, or through settling traps, or electrostatic precipitation.

The dissociation energy for the gas phase dissociation of $UF_6$ to $UF_5$ has not been heretofore reported in the literature but has been calculated by the present inventors as

$UF_6 \rightarrow UF_5 + F$, $\Delta H_f(g) = +76$ kcal/mole.

This calculated dissociation energy indicates that a wavelength of 3750 Å or shorter will cause dissociation. To substantiate this, a nitrogen laser at 3371 Å was used to irradiate a cell of $UF_6$ at 50 Torr and 301° K. The pressure was monitored to a precision of $10^{-3}$ Torr. Under the laser irradiation the pressure decreased at a rate consistent with a photolysis (photodissociation) cross section of about $10^{-21}$ $cm^2$. A fine white powder precipitated from the gas. It was analyzed by x-ray crystallography and shown to be $UF_5$. The quantum yield for this process at the 3371 Å wavelength was found to lie between 0.01 and 1.0. Thus, by cooling natural $UF_6$, preferably to 75° K. or less, and using a finely tuned laser, it is possible to selectively excite one isotopic species and with a sufficient amount of excitation energy to cause the selectively excited molecules to dissociate.

Figure 6:
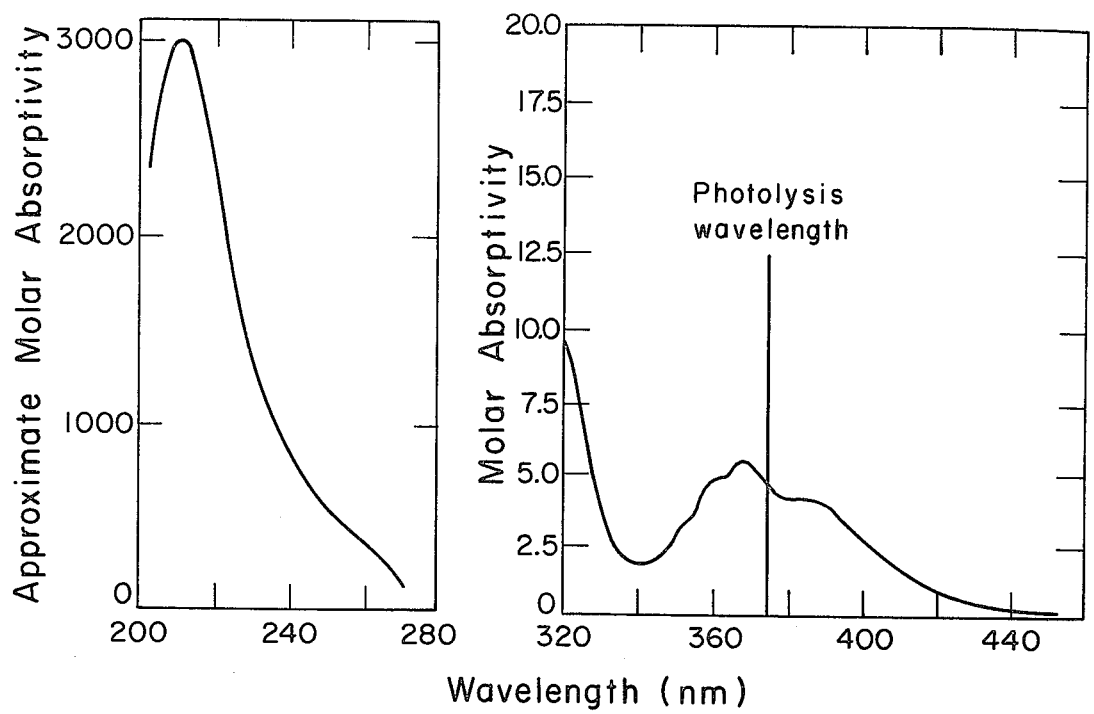
FIG. 6 shows measured ultraviolet absorption of $UF_6$.
Figure 7:
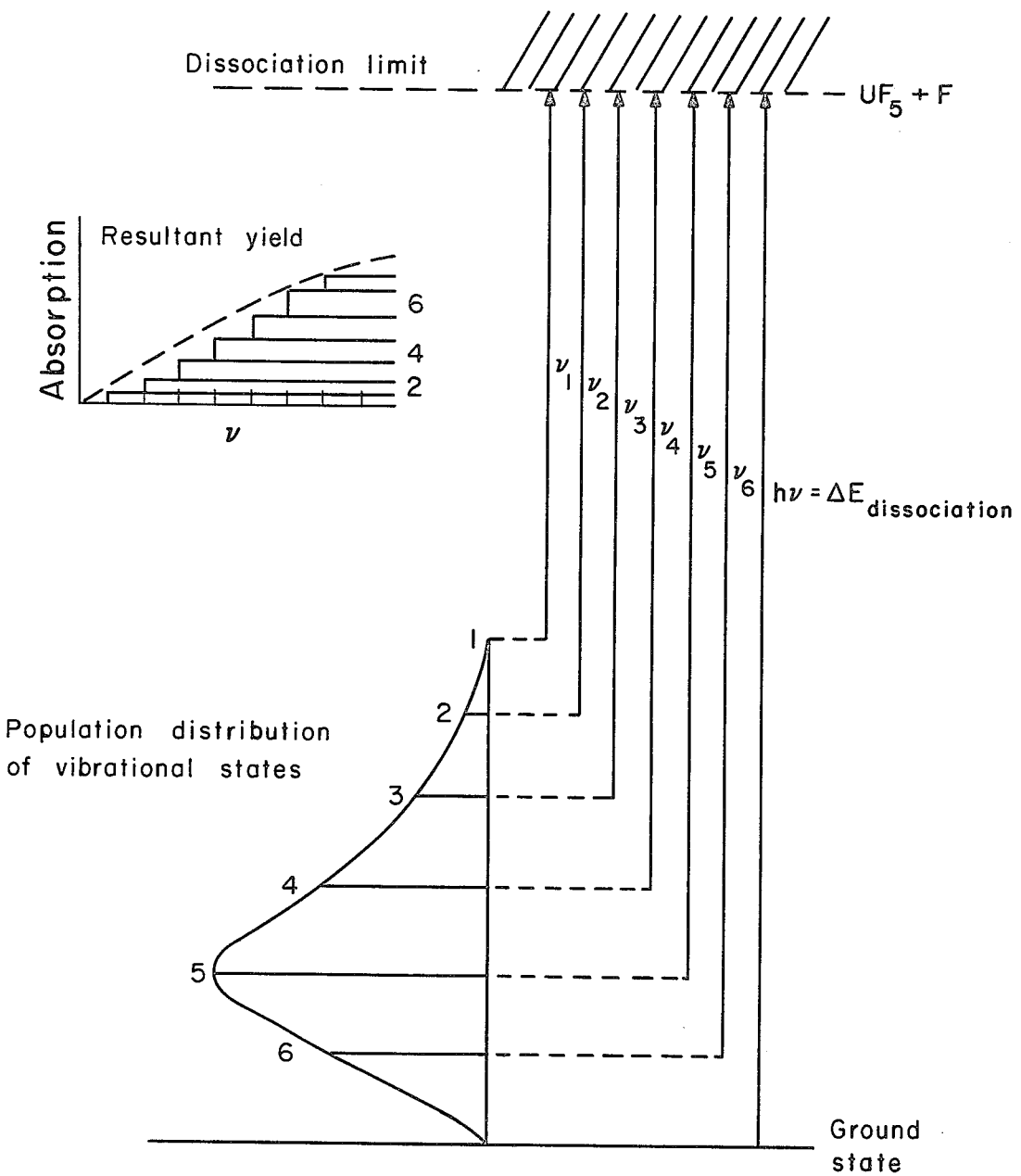
FIG. 7 shows an absorption mechanism for ultraviolet in $UF_6$ which leads to photodissociation.
Figure 8:
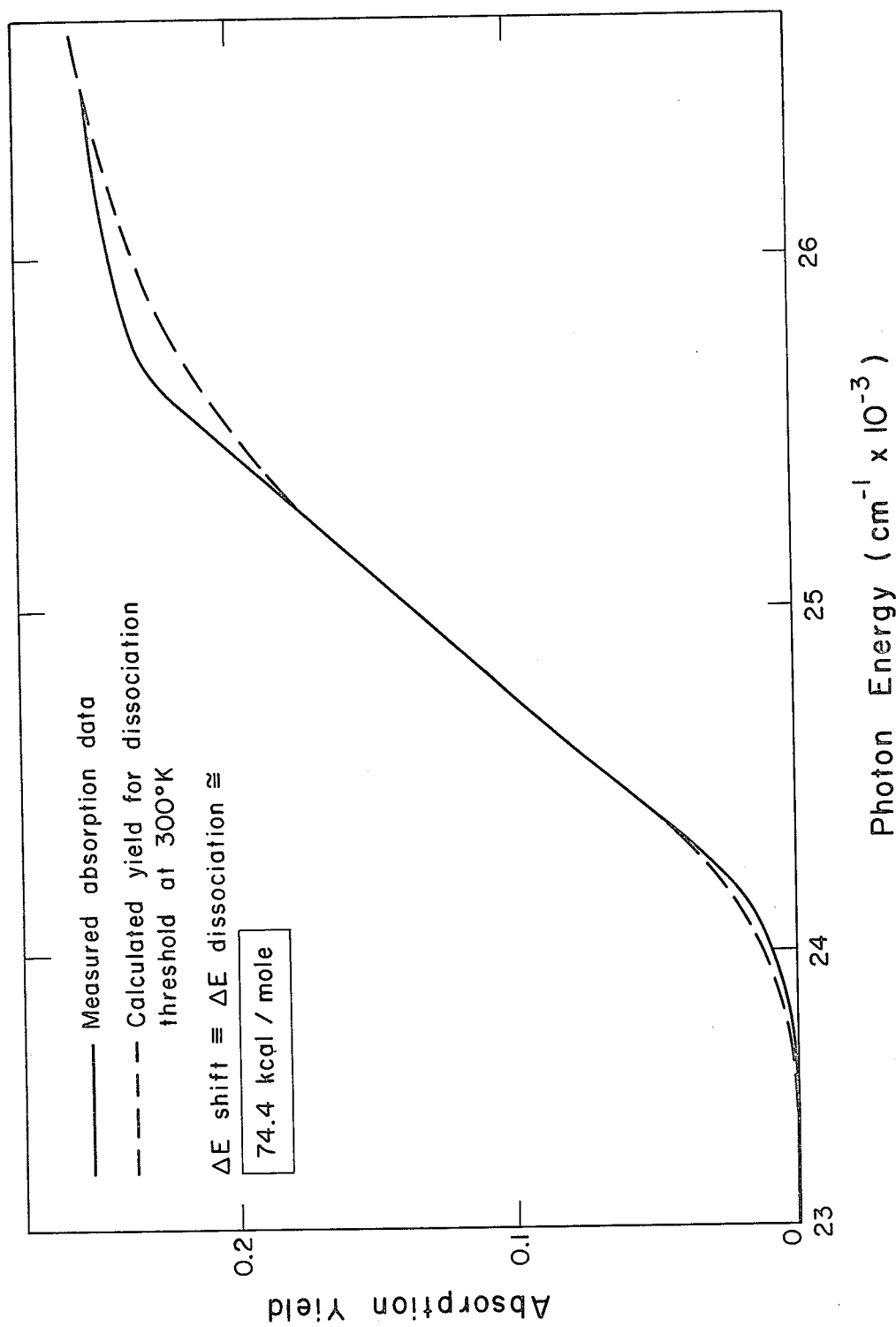
FIG. 8 is a comparison of calculated and measured ultraviolet absorption data for $UF_6$.

Indeed, there is substantial reason to believe that the second photon, i.e., the ultraviolet $h\nu_2$, of the two-photon dissociation will not even be absorbed by those molecules that have not been selective excited by the first photons, i.e., the infrared $h\nu_1$. The ultraviolet absorption of $UF_6$ at room temperature is known in the art to be as shown in FIG. 6. There is measurable absorption only for wavelengths shorter than 0.45 $\mu$m in the ultraviolet. The photolysis wavelength indicated on FIG. 6 is the wavelength at which or below which the calculated dissociation energy indicates that dissociation will occur. It is apparent that the dissociation threshold for $UF_6$ is in the vicinity of the absorption data of FIG. 6. But the optical absorption is immeasurable throughout the near infrared and visible ranges, which indicates that the transition probabiity to the high lying vibrational states is very low. The onset of absorption at 4000 Å suggests that a different mechanism, i.e., the opening of the dissociation channel, is responsible for the absorption. A calculation which tests this suggestion is outlined in FIG. 7. If a sharp absorption (dissociation) threshold exists, an optical wavelength scan will first promote the highest energy "hot band" states to dissociation, then successively operate on the lower lying states as the light is tuned to shorter wavelengths. Thus, the shape of the optical absorption may be predicted by simply integrating the partition function at 300° K. (see FIG. 1) from the right, normalizing to the point where the total integral of states dominate. FIG. 8 compares the results of a calculation of this type with previously measured absorption data obtained by Young (cf. Farrar et al., op. cit.p. 35). The fit to the data is convincing proof that a dissociation mechanism accounts for the absorption. It is thus apparent that since absorption in this spectral range is dependent on matching or exceeding the dissociation threshold, the second photon of a two-photon dissociation should not even be absorbed by those $UF_6$ molecules not excited by the first photon. Thus, the process should be a very selective one, with the first and second photons affecting one isotope only.

Plutonium hexafluoride is a volatile compound quite similar to $UF_6$ in its spectral properties. It has a boiling point at atmospheric pressure of 62.3° C. and a vapor pressure of approximately 100 mm of Hg at 23° C. The process of this invention is applicable to the separation of $^{239}Pu$ from $^{240}Pu$ in a mixture of $^{239}PuF_6$ and $^{240}PuF_6$ in substantially the same fashion as has been described for the separation of uranium isotopes utilizing gaseous $UF_6$.

Although the examples given herein have been limited to the separation of isotopes from $UF_6$ and $PuF_6$ isotopic mixtures, respectively, with the isotopic mixtures initially being at or near room temperature, it will be apparent that the process of this invention is not limited either to the conditions or to the compounds described. For example, in the separation of uranium isotopes, it may well be desirable to begin with isotopic compounds containing two to five atoms which are volatile only at temperatures substantially above room temperature and expanding them to a supersaturated state which is much cooler than the melting point, but which may still be well above room temperature. Examples of such compounds and their melting points are

| Compound | Melting Point, °C. |
|---|---|
| $US_2$ | 1100 |
| $UCl_4$ | 590 |
| $UCl_3$ | 842 |
| $UF_4$ | 960 |
| $UBr_4$ | 516 |
| $UI_4$ | 506 |

Photochemical isotope separation according to the process of this invention is not limited to photolysis, i.e., photodissociation, but also encompasses the use of other photochemical reactions. Thus, for example, homogeneous reactions which may be induced by laser excitation of $UF_6$ include:

$$UF_6^* + N_2F_4 \rightarrow NF_3 + NF_2 + UF_5$$

$$UF_6^* + SF_4 \rightarrow SF_5 + UF_5.$$

Vibrational excitation, denoted by the asterisk, enables the reducing agent to abstract one of the F atoms from the $UF_6$. By providing an excess of the reducing agent, it is possible to ensure that the excited $UF_6$ chemically reacts before it has a chance to collisionally transfer the vibrational excitation to a different isotopic species.

It will be apparent from the foregoing that a critical feature of the present invention is cooling a volatile compound containing a mixture of isotopic species to simplify the optical absorption spectra and sharpen the isotope shifts, while at the same time retaining a sufficient material density to allow a reasonable optical path length for interaction of tuned laser light with the gaseous compound to produce selective photochemical reaction or photoionization of molecules containing a particular isotopic species. The cooling substantially enhances the ability to produce selective absorption in only one isotopic species.

What we claim is:

1. A method of achieving spectrum simplification of $UF_6$ while retaining sufficient vapor pressure to allow gas-phase, laser-induced photochemical reaction of said $UF_6$ to occur with a reasonable optical path length which comprises:
   (a) obtaining said $UF_6$ in a gaseous state with a carrier gas admixed therewith to form a gaseous mixture; and,
   (b) adiabatically expanding said gaseous mixture into a region of uniform pressure by supersonically flowing said gaseous mixture through a convergent-divergent slit nozzle into a constant area duct.

* * * * *

UNITED STATES PATENT AND TRADEMARK OFFICE
CERTIFICATE OF CORRECTION

PATENT NO. : 4,334,883
DATED : June 15, 1982
INVENTOR(S) : C. Paul Robinson et al It is certified that error appears in the above-identified patent and that said Letters Patent is hereby corrected as shown below:

The title should be changed to "Method for Spectrum Simplification of $UF_6$"

Signed and Sealed this

Twenty-sixth Day of February 1985

[SEAL]

Attest:

DONALD J. QUIGG

Attesting Officer   Acting Commissioner of Patents and Trademarks